United States Patent
Alaboson et al.

(10) Patent No.: US 11,453,799 B2
(45) Date of Patent: Sep. 27, 2022

(54) PROCESS FOR PRODUCING THIN COATINGS ON FILM

(71) Applicant: Dow Global Technologies LLC, Midland, MI (US)

(72) Inventors: Justice Alaboson, Freeport, TX (US); Jaclyn Murphy, Freeport, TX (US); Yuanqiao Rao, Freeport, TX (US); Cristina Serrat, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 770 days.

(21) Appl. No.: 16/349,474

(22) PCT Filed: Nov. 10, 2017

(86) PCT No.: PCT/US2017/061088
§ 371 (c)(1),
(2) Date: May 13, 2019

(87) PCT Pub. No.: WO2018/093679
PCT Pub. Date: May 24, 2018

(65) Prior Publication Data
US 2019/0292396 A1    Sep. 26, 2019

Related U.S. Application Data

(60) Provisional application No. 62/422,671, filed on Nov. 16, 2016.

(51) Int. Cl.
| | |
|---|---|
| *C09D 123/06* | (2006.01) |
| *B05D 3/04* | (2006.01) |
| *B05D 7/26* | (2006.01) |
| *C08F 110/02* | (2006.01) |
| *C09D 5/00* | (2006.01) |
| *C08J 7/06* | (2006.01) |
| *C08J 7/048* | (2020.01) |

(52) U.S. Cl.
CPC ........... *C09D 123/06* (2013.01); *B05D 3/046* (2013.01); *B05D 7/26* (2013.01); *C08F 110/02* (2013.01); *C08J 7/048* (2020.01); *C08J 7/06* (2013.01); *C09D 5/00* (2013.01); *C08J 2323/00* (2013.01); *C08J 2323/06* (2013.01)

(58) Field of Classification Search
None
See application file for complete search history.

(56) References Cited

U.S. PATENT DOCUMENTS

| | | | |
|---|---|---|---|
| 5,795,628 A * | 8/1998 | Wisard | C23C 14/30 427/596 |
| 6,896,926 B2 | 5/2005 | Qiu et al. | |
| 8,193,027 B2 | 6/2012 | Xiao et al. | |
| 8,234,998 B2 | 8/2012 | Krogman et al. | |
| 8,563,353 B2 | 10/2013 | Xiao et al. | |
| 8,801,913 B2 | 8/2014 | Wang | |
| 9,090,971 B2 | 7/2015 | Weimer et al. | |
| 2004/0194691 A1 * | 10/2004 | George | C23C 16/0272 117/84 |
| 2006/0269667 A1 | 11/2006 | Ma et al. | |
| 2007/0036999 A1 * | 2/2007 | Rogers Agent | C09D 129/04 427/372.2 |
| 2008/0038463 A1 | 2/2008 | Chen et al. | |
| 2010/0151274 A1 | 6/2010 | Kang et al. | |
| 2012/0121932 A1 | 5/2012 | George et al. | |
| 2013/0034689 A1 * | 2/2013 | Hunt | B32B 27/08 428/688 |
| 2013/0084672 A1 | 4/2013 | Keszler et al. | |
| 2013/0236641 A1 | 9/2013 | Aizenberg et al. | |
| 2013/0344240 A1 * | 12/2013 | Godfroid | C23C 16/403 427/223 |

FOREIGN PATENT DOCUMENTS

| | | | | |
|---|---|---|---|---|
| EP | 794266 A1 * | 9/1997 | | C23C 14/28 |
| WO | 2016/136842 A1 | 9/2016 | | |
| WO | WO-2017005597 A1 * | 1/2017 | | B32B 27/08 |

OTHER PUBLICATIONS

S. George, Chem. Rev. 2010, 110, 111-131.
G. Czeremuszkin et al., Plasmas and Polymers, vol. 6, Nos. 1/2, Jun. 2001, 107-120.
Y. Wu, et al., Nano Lett., 2015, 15, 6379-6385.

* cited by examiner

*Primary Examiner* — Christopher M Rodd
(74) *Attorney, Agent, or Firm* — Quarles & Brady LLP

(57) ABSTRACT

Conventional atomic layer deposition technology is modified to increase its cost-effective viability for use in producing thinly coated flexible packaging film. In one embodiment a thinly coated flexible substrate, e.g., a polyolefin film, is made by a process comprising the steps of: (A) Dissolving a self-limiting precursor in a solvent to form a solution of dissolved self-limiting precursor in the solvent, (B) Applying the solution to a facial surface of a flexible polymer film so that at least a portion of the dissolved self-limiting precursor attaches to the facial surface of the film and the solution is at least partially depleted of self-limiting precursor, and (C) Curing the attached self-limiting precursor by contact with oxygen.

10 Claims, 3 Drawing Sheets

Zn 2p Spectra

Figure 3
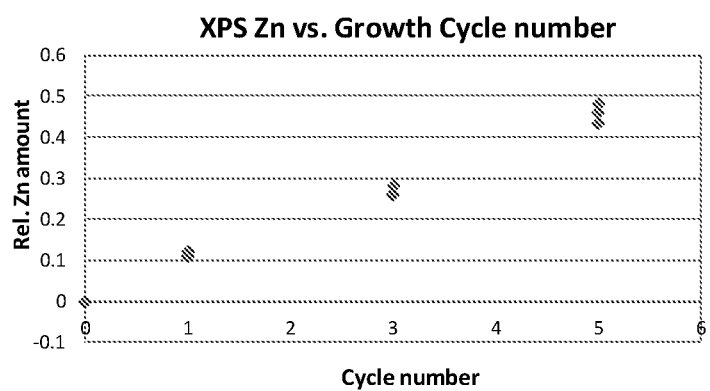
Figure 4A                    Figure 4B
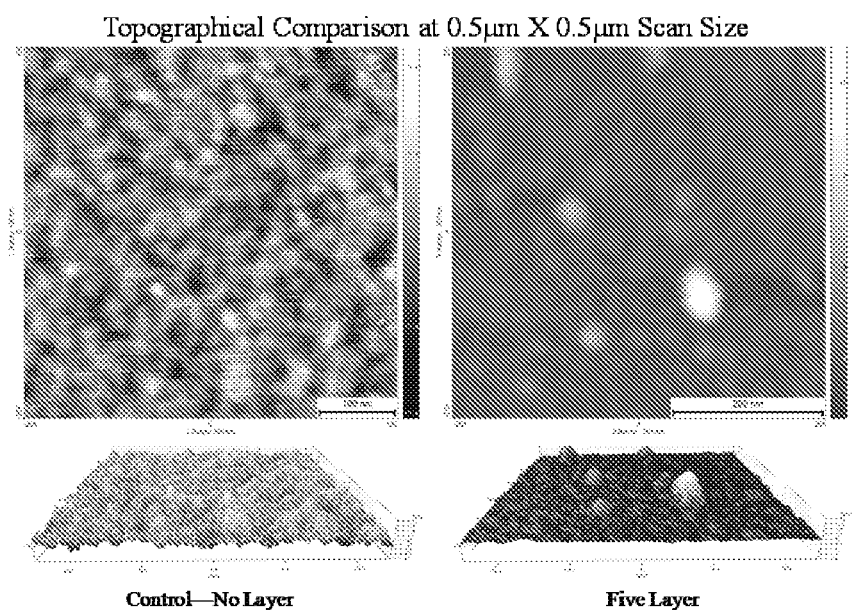

PROCESS FOR PRODUCING THIN COATINGS ON FILM

FIELD

This invention relates to high oxygen barrier and high moisture barrier flexible packaging film, and a solution-based process for producing the film. The product of the process comprises a flexible film substrate with a thin coating on the film substrate. In one aspect the invention relates to a solution-based atomic layer deposition (ALD) process for producing a thin inorganic or inorganic-hybrid coating on a polymeric film substrate, while in another aspect, the invention relates to flexible packaging made by the process.

BACKGROUND

Many food, medical and pharmaceutical packaging applications require high barrier film materials, and presently aluminum foil is the dominant choice for this market. The packaging industry is looking for an aluminum foil replacement with a similar or better barrier performance, e.g., an oxygen transmission rate (OTR) of 0.05 cubic centimeters per 100 square inches per day (cc/100 $in^2$/day) or less at a high relative humidity (RH) (50% or greater), and a water vapor transmission rate (WVTR) of 0.05 grams per 100 square inches per day (g/100 $in^2$/day) or less), but with clarity (transparency), and durability (e.g., elongation of 5-10%, flex crack resistant) at a lower or equal cost, and with the overall flexible packaging structure preferably being recyclable in existing recycling streams.

A thinly coated polymeric (e.g., polyolefin, particularly polyethylene) film structure can offer both high moisture and high oxygen barrier and meet all other desired requirements described above. Moreover, barrier performance can be tuned through adjustments in the composition of the film and the coating.

A number of promising new technical approaches for producing a thinly coated polymer film substrate with the requisite performance requirements are available (and, in some cases, commercial) but these typically come with a cost structure that is prohibitive and/or with the need for additional and low productivity process steps. These include vapor deposition of an oxide coating with a protective overcoat, polymers with nanoclay fillers, nanoclay water-based coatings, layer-by-layer technologies, and polymer-nanoparticle coatings. For some of these technologies, the barrier performance and other critical-to-quality properties have not been independently validated.

Atomic layer deposition (ALD), as well as its derivative, molecular layer deposition, (MLD), is a well-known technology. See, for example, U.S. Pat. Nos. 9,090,971; 8,801,913; 6,896,926; 8,234,998; 8,829,54; US 2012/0121932; US 2008/0038463; and US 2006/0269667. See also George, Steven M., *Atomic Layer Deposition: An Overview*, Chem. Rev., 110, 111-131, Nov. 30, 2009; and Wu, Yanlin, et al., *Atomic Layer Deposition from Dissolved Precursors*, Nano Lett., 2015, 15, 6379-6385. Some embodiments of this technology is currently used to produce thinly coated plastic packaging with high OTR and WVTR barriers. However, the economic viability and/or the added complexity and capital cost of these processes have ultimately slowed down their wide adoption by the packaging industry.

SUMMARY

In one embodiment, atomic layer deposition technology is modified for use in producing thinly coated flexible packaging film. This inventive ALD process includes the use of solvents, self-limiting precursors, and ambient curing.

In one embodiment, the invention is a process for producing a thinly coated, flexible polymeric film.

In one embodiment, the invention is a process for producing a thinly coated, flexible polymeric film comprises:
(A) Dissolving a self-limiting precursor in a solvent to form a solution of dissolved self-limiting precursor in the solvent,
(B) Applying the solution to a facial surface of a flexible polymer film so that at least a portion of the dissolved self-limiting precursor attaches to the facial surface of the film and the solution is at least partially depleted of self-limiting precursor, and
(C) Curing the attached self-limiting precursor by contact with oxygen.

In one embodiment, the self-limiting precursor depleted solution is removed from the facial surface of the film before the attached self-limiting precursor is contacted with oxygen.

In one embodiment, only the solvent is removed from the facial surface of the film, and both the attached self-limiting precursor and the non-attached self-limiting precursor remaining from the partially depleted solution are cured by contact with oxygen.

In one embodiment, the oxygen is unbound gaseous oxygen, e.g., oxygen, enriched-oxygen, air, etc.

In one embodiment, the oxygen is bound oxygen, e.g., water vapor. In one embodiment the bound oxygen is liquid, e.g., liquid water.

In one embodiment the solution of dissolved self-limiting precursor is applied to the facial surface of a flexible polymer film by any conventional coating technique including, but not limited to, dip coating, spin coating, blade coating and slot die coating.

In one embodiment the self-limiting precursor attaches to the facial surface of the flexible film as a single layer.

In one embodiment, the invention is a process for producing a thinly coated, flexible polymeric film, the process comprising:
(A) Dissolving a self-limiting precursor in a solvent to form a solution of dissolved self-limiting precursor in the solvent,
(B) Applying the solution to a facial surface of a flexible polymer film so that at least a portion of the dissolved self-limiting precursor attaches to the facial surface of the film and the solution is at least partially depleted of self-limiting precursor,
(C) Removing the self-limiting precursor depleted solution from the film, and
(D) Curing the attached self-limiting precursor by contact with oxygen.

In one embodiment steps (B), (C) and (D) are repeated one or more times, i.e., after the cure step of (D), a solution comprising dissolved self-limiting precursor (a new solution of (A), or the depleted solution of (B), or the depleted solution of (B) replenished with added dissolved self-limiting precursor) is applied to the facial surface of the flexible polymer film comprising cured self-limiting precursor, depleted solution is removed, and the newly attached precursor cured. In this embodiment each new addition of self-limiting precursor attaches to the previously cured self-limiting precursor as opposed to the facial surface of the film itself. In this manner, multiple layers of precursor can be added to the facial surface of the film in a controlled amount, also allowing for tunable barrier properties. In this embodiment, layers of different composition can be added to the flexible film, e.g., a first layer of aluminum oxide ($Al_2O_3$) followed by a second layer of titanium oxide ($TiO_2$), followed by a third layer of $Al_2O_3$, etc.

In one embodiment, step (B) is followed by direct curing of the depleted solution on the facial surface of the polymeric film (without the rinse step of (C)) during which the solvent evaporates, and the remaining precursor molecules oxidize to form a coating which grows on the first layer of the cured precursor. In one embodiment, the procedure is repeated one or more times such that the remaining precursor molecules oxidize to form a coating which grows on the preceding layer of cured precursor.

In one embodiment, the precursor solution comprises one or more additives, e.g., polymer, filler, nano-particles, etc. Such additives can improve film properties, e.g., flex crack resistance, over films prepared with precursor solutions without the additive.

The concentration of precursor in the solution, the ultimate coating thickness and composition (i.e., the number and composition of layers of precursor applied to the facial surface of the substrate), and the intermediate solvent rinse steps prior to cure, can all be modulated to achieve the desired end product thickness (i.e., the combined thicknesses of the substrate and cured precursor coating) or coating growth rate, and consequently, the desired barrier properties.

BRIEF DESCRIPTION OF THE DRAWINGS

FIG. 3 is a plot reporting the relative amount of zinc on the film as a function of growth cycle number as described in the Example.

FIGS. 4A and 4B are atomic force microscopy images comparing a bare silicon wafer (FIG. 4A) and a similar wafer that has been subjected to five cycles of ZnO coatings as described in the Example.

DETAILED DESCRIPTION

Definitions

Figure 1:
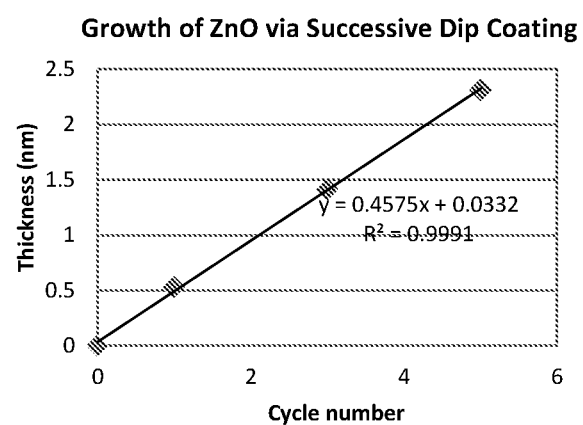
FIG. 1 is a plot reporting the growth of zinc oxide (ZnO) by successive dip coatings as described in the Example.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed used in this disclosure include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Self-limiting precursor" and like terms mean that the precursor does not react with itself. In the first application of the dissolved self-limiting precursor to the substrate surface, the precursor will only react with the substrate surface. Once the substrate surface is saturated, the self-limiting precursor will not react further and the result is that the substrate surface will contain only a single layer of precursor. Excess self-limiting precursor in the solvent, i.e., that remaining in the depleted solution of Step (C), is removed from the substrate (typically with a rinse step), the attached (reacted) precursor cured, and self-limiting precursor added in a second cycle will again not react with itself and attach (react) only to (with) the cured precursor from the previous cycle.

"Flexible" and like terms mean capable of being bent, typically without breaking. In the context of this invention, flexible is exemplified by polymeric films, particularly packaging films.

"Facial surface," "planar surface" and like terms refer to the flat surfaces of the layers that are in contact with the opposite and adjacent surfaces of the adjoining layers. Facial surfaces are in distinction to edge surfaces. A rectangular layer comprises two facial surfaces and four edge surfaces. A circular layer comprises two facial surfaces and one continuous edge surface.

"Thinly coated" and like terms mean a coating (i) on a substrate, and (ii) with a thickness of not greater than 5,000 nanometers (nm).

"Cure", "cured", "curing" and like terms mean the process by which the self-limiting precursor is converted into a coating on either a facial surface of a substrate or on a layer of previously cured precursor.

Flexible Polymeric Film

Any flexible, polymeric film that has at least one facial polymeric surface can be used as the flexible polymer substrate in the practice of this invention. The polymer component of the film includes, but is not limited to, polyolefins, polyamides, polycarbonates, polyurethanes, PET, polyethers, polyesters, polysulfides, polysiloxanes, polysilanes, phenol-formaldehyde polymers, polyimines, and the like.

In one embodiment the flexible, polymeric film comprises a polyolefin. The polyolefins useful in making the films used in the practice of this invention include both homopolymers and interpolymers. Examples of polyolefin homopolymers are the homopolymers of ethylene and propylene. Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The polyolefin can also comprise one or more functional groups such as an unsaturated ester or acid, and these polyolefins are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

More specific examples of polyolefins that can comprise the substrate films useful in the practice of this invention include, but are not limited to low, medium and high density polyethylene. The high density polyethylene (HDPE) resins from which the films used in the practice of this invention can be made are well known, commercially available, and made by any one of a wide variety of processes including, but not limited to, solution, gas or slurry phase; Ziegler-Natta or metallocene catalyzed; etc. These resins typically have a density greater than 0.941 g/cm$^3$ and a melt index ($I_2$) of 0.1 to 4.0. Commercially available HDPE resins include but are not limited to DOW High Density Polyethylene resins and CONTINUUM™ and UNIVAL™ high density polyethylene resins, all available from The Dow Chemical Company, BS2581 available from Borealis, Hostalen ACP 5831D available from Lyondell/Basell, HD5502S available from Ineos, B5823 and B5421 available from Sabic, SURPASS™ HPs167-AB available from Nova Chemicals and HDPE 5802 and BM593 available from Total.

The linear low density polyethylene (LLDPE) resins from which the films used in the practice of this invention can be made are also well known, commercially available, and made by any one of a wide variety of processes including, but not limited to, solution, gas or slurry phase; Ziegler-Natta or constrained geometry catalyzed; etc. These resins typically have a density of 0.915 to 0.925 g/cm$^3$, a melt index ($I_2$) of 0.15 to 4.0. Commercially available LLDPE resins include but are not limited to Dow DOWLEX™ ATTANE™, ELITE™, ELITE™ AT, INNATE™ resins, all available from The Dow Chemical Company and, in general, any fractional MFI resin for use in heavy duty bags or agricultural films such as those available from Borealis, Basel, Sabic and others.

The medium density polyethylene (MDPE) resins from which the films used in the practice of this invention can be made are also well known, commercially available, and made by any one of a wide variety of processes including, but not limited to, solution, gas or slurry phase; Ziegler-Natta or constrained geometry catalyzed; etc. These resins typically have a density of 0.925 to 0.940 g/cm$^3$, a melt index ($I_2$) of 0.1 to 4.0. Commercially available MDPE resins include but are not limited to the DOWLEX™, ELITE™, ELITE™ AT resins available from The Dow Chemical Company.

The polyolefins that can comprise the substrate films useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY™ polymers available from The Dow Chemical Company, and the VISTAMAXX™ polymers available from ExxonMobil Chemical Company.

The flexible, polymeric substrates of this invention can comprise one or more materials other than the polymer. Exemplary other materials include, but are not limited to, fillers and various additives such as antioxidants, colorants, processing aids, nucleating agents, tackifiers, etc. The substrate films can be single or multilayer and if multilayer, the polymers in the different layers can be the same or different. For reasons of recyclability, preferably the polymers of each layer are of similar composition, e.g., each is a polyethylene (although the structure of the polyethylene can vary, e.g. LLDPE, MDPE, long chain branched, short chain branched, linear, etc.). Multilayer substrate films can comprise non-polymeric materials, e.g., paper, metal foil, etc., but these typically are disfavored because they inhibit recyclability and transparency. If present, then they are typically present as an internal layer, and if present as an external facial layer, then not as the external facial layer to which the self-limiting precursor attaches. The facial surface of the polymeric film substrate that is to be reacted with the precursor is made from a polymer, preferably a polyolefin, particularly a polyethylene, and the facial surface can be treated in any manner, e.g., chemically, mechanically, corona, etc., to facilitate attachment to (reaction with) the precursor. The thickness of the substrate film can vary to convenience.

Self-Limiting Precursor

Any compound that will react with (attach to) the facial surface of the flexible polymer film substrate and that will not react with itself can be used as the self-limiting precursor in the practice of this invention. Typical self-limiting metal precursors employed for atomic layer deposition (ALD) include metal halides (e.g. metal chlorides, fluorides, bromides or iodides), metal alkyls (e.g. Al, Zn, In, Ga alkyl compounds), metal alkoxides (e.g titanium isoproproxide, hafnium tert-butoxide, etc.), β-diketonates (e.g., $Zr(thd)_4$, etc.), cyclopentadienyl compounds (e.g. dicyclopentadienyl dimethyl hafnium, etc.), metal alkyl amides (e.g. Hafnium dimethylamide, etc.), metal amidinates, and alkylamido precursors (e.g. tetrakis(dimethylamido)zirconium, tetrakis(diethylamido)hafnium, etc.) among others. These are typically combined with oxygen sources ($O_2$, $H_2O$, $H_2O_2$), nitrides (e.g. $NH_3$) or sulfides (e.g., $H_2S$) to grow oxide films ($Al_2O_3$, ZnO, $TiO_2$, $ZrO_2$, $HfO_2$, $SiO_2$, $Y_2O_3$, $Ta_2O_5$, etc.), nitride films (e.g., TiN, TaN, etc.), sulfide films (ZnS, CdS), phosphide films (GaP and InP) and metal films (Pt, Cu, Mo), among others. Preferred options are organometallic precursors that have high reactivity at room or low temperatures such as the metal alkyls, metal alkoxides, and metal alkyl amides. Self-limiting precursors are further describe at Leskela, M., et al., *Atomic Layer Deposition (ALD): From Precursors to Thin Film Structures, Proceedings of the 2$^{nd}$ Asian Conference on Chemical Vapour Deposition*, Thin Solid Films, Vol. 209, Issue 1, 22 Apr. 2002, pp. 138-146; George, S. M., *Atomic Layer Deposition: An Overview*, Chem. Rev., 2010, 110 (1), pp. 111-131; Charles B. Musgrave & Roy G. Gordon, *Precursors for Atomic Layer Deposition of High-k Dielectrics*, 18 Future Fab Int'l 126 (2005), http://faculty.chemistry.harvard.edu/files/Gordon/files/Presursors_for_ald.pdf (last visited Oct. 25, 2016); and Hausmann, D. M., et al, *Atomic Layer Deposition of hafnium and Zirconium Oxides Using Metal Amide Precursors*, Chem. Mater., 2002, 14, 4350-4358.

Solvent

Any compound that will solubilize the self-limiting precursor to form a solution of self-limiting precursor and solvent, and that will not react with the self-limiting precursor or the facial surface of the polymer substrate, can be used in the practice of this invention. Solvent choices will depend on the precursor, substrate, and coating conditions (target viscosity or concentration, target temperature, etc.), but may be chosen from the list of aqueous based solvents, non-polar solvents (e.g. hexane, pentane, benzene, toluene, diethyl ether, etc.), polar aprotic solvents (e.g., THF, ethyl acetate, etc.) and polar protic solvents (e.g., ethanol, methanol, acetic acid, etc.). For example, non-polar solvents (hexane, pentane) are good candidates to solubilize metal alkyls (e.g. TMA, TEA, DEZ, etc.).

Process

The process of this invention is performed using conventional equipment and techniques. The self-limiting precursor is chosen to be reactive with the facial surface of the flexible polymer substrate, typically a film. The facial surface of the film can be treated or untreated and if treated, the treatment can be of any nature. The precursor is dissolved with a solvent to form a solution, and the concentration of the precursor in the solution can vary to convenience. Typical concentrations are in the range of 0.001 molar (M) to 1 M.

Once the precursor solution and substrate are ready, the solution of precursor in solvent is applied to a facial surface of the substrate in any convenient manner, e.g., dip coating, spin coating, blade coating, slot die coating, etc. Exposure time will vary with the composition of the precursor, facial surface of the substrate (both compositionally and treatment, if any), conditions of the contacting (e.g., temperature, pressure, etc.), and the like. Typically the exposure time of the precursor solution to the facial surface of the substrate is at least 0.1 seconds (s), or 0.5 s, or 1 s.

After the precursor solution has been exposed to the facial surface of the substrate for a sufficient amount of time such that a single layer of precursor has attached to the facial surface of the substrate (i.e., the facial surface of the substrate is saturated with self-limiting precursor), then the solution depleted of precursor is removed from the facial surface of the substrate. The depleted solution can be removed by any method, but typically it is simply rinsed from the surface with another liquid, typically the solvent used to solubilize the precursor. The facial surface of the substrate can be rinsed one or more times, and each rinse can extend for 0.1 s or more, typically 1 s or more. The rinse can be static, i.e., the rinse liquid lies quiescent on the facial surface, or, preferably, dynamic, i.e., the rinse liquid is moved across the facial surface of the substrate, e.g., through a shaking or stirring motion, or as a cascade washing over the surface. The combination of depleted solution and rinse liquid can then be used as the precursor solution in a second cycle (in this instance, typically the solvent and rinse liquid are the same) either without modification, or the amount of self-limiting precursor in the recovered solution plus rinse can be increased either by adding self-limiting precursor or by removing solvent by any conventional means, e.g., evaporation, etc. Alternatively, the depleted solution and/or rinse liquid can be discarded in an environmentally acceptable manner.

Once the precursor solution has been removed from the facial surface of the substrate, the attached precursor is cured by exposure to oxygen, e.g., air, oxygen-enriched air, an oxygen/water vapor mix, water vapor alone, etc. The cure exposure time will vary with the composition of the attached precursor, the cure agent (e.g., heat, electron beams, chemical additive, etc.), the cure conditions (e.g., temperature, pressure (including partial or total vacuum), etc.). Typical cure exposure times range from 0.1 s to 1 hour, more typically from 1 s to 10 minutes.

The thickness of the end product, i.e., the thinly coated film substrate, is typically between 5 and 200 microns (μm). The number of layers of cured precursor and the thickness of the individual and combined cured precursor layers can vary to convenience, but typically the total thickness of the coating is less than 50%, or 40%, or 30%, of the combined thickness of the film substrate and coating. The thinly coated substrates of this invention typically exhibit coating uniformity and conformity to the facial surface of the substrate.

As noted above, the facial surface of the film substrate to be coated with the self-limiting precursor can be treated or untreated and if treated, the treatment can vary widely, e.g., chemical, corona, physical (e.g., abrasion).

Example

The following protocol is used to dip coat zinc oxide (ZnO) on silicon wafers:

(1) Prepare a 1 M solution of diethyl zinc (DEZ) in anhydrous pentane.
(2) Place test silicon wafers in 4 ounce oven-dried glass jar. Add 2 mL of DEZ solution to jar. Allow Si wafers to sit in DEZ solution for 10 minutes.
(3) Transfer wafers using Teflon tweezers to clean jar and rinsed wafers three times with fresh pentane. The rinsing step is incorporated to grow very thin layers at a time.
(4) Cap jar and bring the samples out of the glove box. The jar is carefully opened in a fume hood and the samples are exposed to air for 5 minutes.
(5) Samples are brought back into the glove box and steps 1-4 are repeated until the desired number of cycles are performed.

FIG. 1 shows the measured ellipsometric thickness of film as a number of coating cycles. The linearity of the thickness of the film with deposition cycle number, shows successive and controllable growth of film with cycle number.

Figure 2:
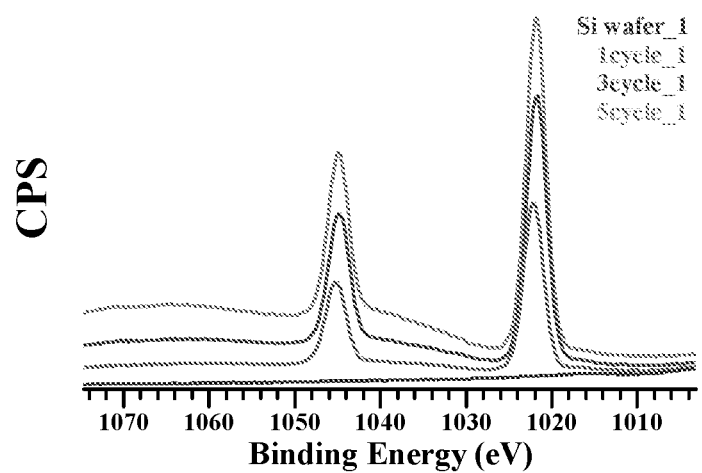
FIG. 2 is a plot reporting the X-ray photoelectron spectroscopy of substrate films as a function of coating cycles as described in the Example.

FIG. 2 shows the X-ray photoelectron spectroscopy of the substrate films as a function of coating cycles. The peaks above indicate the presence of Zn arising from ZnO. Intensity of the peaks increase as a function of coating cycles, again showing the increase in ZnO with coating cycles.

FIG. 3 shows the relative amount of Zn in the film as a function of growth cycle number. The relative amount of zinc is the relative intensity of the Zn XPS peak to that of the Si XPS peak. The linearity of the plot demonstrates controllable and predictable ZnO growth.

FIGS. 4A and 4B show atomic force microscopy (AFM) images of a bare silicon wafer (FIG. 4A) and one that has been subjected to 5 cycles of ZnO film coatings (FIG. 4B). The comparison between the images show an increase in surface roughness of the ZnO coated Si due to the presence of the overcoat layer. The AFM scan also shows the uniformity of the film across the surface of the sample.

Figure 5:
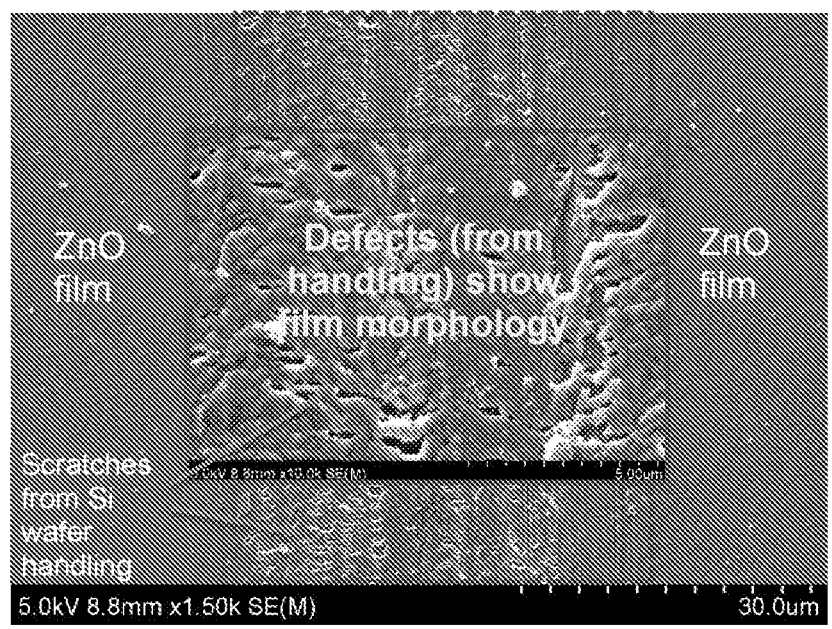
FIG. 5 is an SEM image of a silicon wafer that has been subjected to five cycles of ZnO coatings as described in the Example.

FIG. 5 shows an SEM image of the 5 cycle ZnO film on Si wafer substrate. The image is essentially featureless, disregarding the presence of surface contaminants. Hence only defects could be imaged, such for example arising from scratches generated through sample handling. Upon imaging a region of these defects (as shown in the outlined area), clearly a scratch perturbed a layer of film on the surface.

What is claimed is:

1. A process for producing a flexible packaging film, the process comprising the steps of:
    (A) Dissolving a self-limiting precursor in a solvent to form a solution of dissolved self-limiting precursor in the solvent,
    (B) Applying the solution to a facial surface of a flexible polymer film so that at least a portion of the dissolved self-limiting precursor attaches to the facial surface of the film and the solution is at least partially depleted of self-limiting precursor, and
    (C) Curing the attached self-limiting precursor by contact with oxygen.

2. The process of claim 1 in which the polymer film comprises a polyolefin.

3. The process of claim 2 in which the polymer film comprises a polyethylene.

4. The process of claim 1 in which the solution is applied to the facial surface of the substrate by a process of dip coating, spin coating, blade coating or slot die coating.

5. The process of claim 1 in which the depleted solution of self-limiting precursor is removed from the facial surface of the substrate before contacting the attached self-limiting precursor with oxygen by rinsing the surface with the solvent used to form the solution of precursor.

6. The process of claim 1 in which the depleted solution of self-limiting precursor is not removed from the facial surface of the substrate before contacting the attached self-limiting precursor with oxygen.

7. The process of claim 1 in which the attached self-limiting precursor is cured by contact with at least one of gaseous oxygen, air and water vapor.

8. The process of claim 1 in which the self-limiting precursor is at least one of a metal alkyl, metal halide, a metal alkoxide, a cyclopentadienyl compound, a metal alkyl amide, a metal amidinate, and an alkylamido compound.

9. A process for producing a high an oxygen barrier and high moisture barrier, flexible packaging film, the process comprising the steps of:
    (A) Dissolving a self-limiting precursor in a solvent to form a solution of dissolved self-limiting precursor in the solvent,
    (B) Applying the solution to a facial surface of a flexible polymer film so that at least a portion of the dissolved self-limiting precursor attaches to the facial surface of the film and the solution is at least partially depleted of self-limiting precursor,
    (C) Removing the self-limiting precursor depleted solution from the facial surface of the film, and
    (D) Curing the attached self-limiting precursor by contact with oxygen.

10. The process of claim 9 in which steps (B), (C) and (D) are repeated at least once.

* * * * *